April 15, 1930.   R. W. HAGEL   1,754,553
COFFEE PERCOLATOR
Filed March 8, 1929
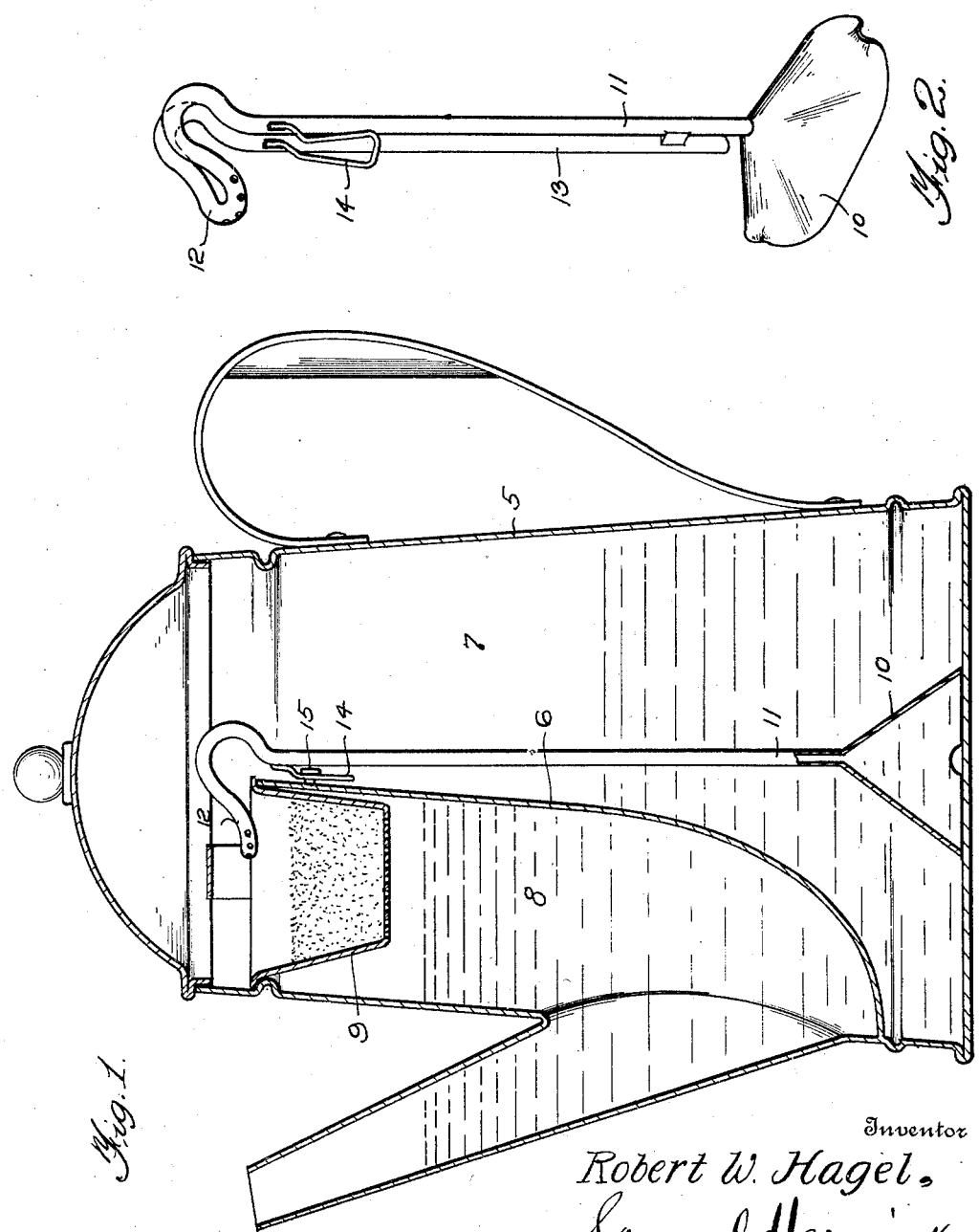
Inventor
Robert W. Hagel,
By Samuel Herrick
Attorney Patented Apr. 15, 1930

1,754,553

UNITED STATES PATENT OFFICE

ROBERT WILLIAM HAGEL, OF NEW ORLEANS, LOUISIANA

COFFEE PERCOLATOR

Application filed March 8, 1929. Serial No. 345,469.

This invention relates to percolators of the character of those shown in my prior Patents, Nos. 1,577,431 of March 16, 1926, and 1,646,022, of October 18th 1927.

While the device of the present invention may be utilized for the making of beverages other than coffee, such as tea, for example, I will describe its use in conjunction with the making of coffee.

In the patents aforesaid, water is delivered from one compartment of the coffee pot, which contains only clear water, to a point above the ground coffee, and discharged thereon in such manner as to percolate through the body of ground coffee, and into a wholly separate compartment. That is to say, the liquid does not return to the compartment in which it was originally contained and mixed with the whole body of water in the receptacle, as is the common practice in many coffee percolators, but, upon the contrary, is kept separate from the main body of water. The arrangement is such that when the water in the main compartment has boiled off to a predetermined degree, the operation of delivering water from the main or clear water compartment to the made coffee compartment, ceases, so that burning of the pot is effectually guarded against.

The present invention relates to a novel type of percolating element for coffee pots of the character above described, by virtue of which a flow of water is maintained from the clear water compartment to a point above the ground coffee receptacle, and thence back to the clear water compartment, a desired amount of the circulated water being delivered upon the ground coffee.

In the accompanying drawings,

Fig. 1 is a sectional view of a coffee pot, constructed in accordance with the invention, and Fig. 2 is a perspective view of the improved circulating element.

Like numerals designate corresponding parts in both the figures of the drawing.

In the drawing, 5 designates a coffee pot, which is divided by a wall 6, into a main or clear water compartment 7, and made coffee compartment 8. A cup-like receptacle 9 receives the ground coffee. Water is delivered from compartment 7 to compartment 8 by the action of an improved water circulating medium, comprising a hood 10, which rests upon the bottom of the pot, and a tube which is bent to form a vertical leg 11, then bent to form a return bend goose-neck 12, which overlies the ground coffee in the cup 9, and terminates in a downturned leg 13, which stops short of the hood 10. This water circulating element is provided with a wire loop 14, which is adapted to engage a headed projection 15 upon the rear face of the wall 6, and to be held in place thereby. The hood 10 and tube 11 are preferably of copper or like non-corrosive material, and the opposite end portions of the hood 10 are bent in such manner as to leave funnel shaped openings, having their largest portions disposed outwardly, so that water may pass from the compartment 7 to the interior of the hood 10. Since the whole volume of water in the compartment 7 is exerting a pressure downwardly, this funnel like formation of the hood provides intake openings 16, through which water freely enters the hood. When heat is applied to the bottom of the pot, either directly by a stove, or otherwise, water inside of the hood becomes heated to a greater extent than the water outside of the hood, and a circulation of the water takes place; first upwardly through tubes 11, and then downwardly through tube 13, the water being finally discharged through the lower end of tube 13 to the interior of compartment 7, outside of the hood 10. The goose-neck 12 is provided with a number of holes. These may be of varying sizes and may vary in number, and they serve to distribute some of the water circulated or siphoned by the water circulating element over the upper surface of the coffee in cup 9.

From the foregoing description, it will be seen that the present arrangement provides a very simple and inexpensive water circulating element or siphon, by means of which a continuous circulation is set up from one point in the clear water compartment to another point in the clear water compartment, but that some of the water set in circulation is delivered upon the ground coffee. Since water continuously flows from the holes in the goose-neck, it follows that these holes can never clog up.

It will further be seen that the device of the present invention is adapted to make genuine drip coffee, and that it may be utilized to make just as small an amount of coffee as may be desired, without danger of burning the pot. This is due to the fact that the liquid percolated through the ground coffee goes into a made coffee compartment from whence it may be drawn off at will, and is not returned to the clear water compartment, as in many of the coffee percolators now in use.

It is to be understood that the invention is not limited to the precise construction set forth, but that it includes within its purview whatever changes fairly come within either the terms or the spirit of the appended claims.

Having described my invention, what I claim is:

1. A device of the character described, comprising a clear water compartment and a made coffee compartment, a cup for the reception of ground coffee, above the made coffee compartment, and a water circulating element comprising a hood, and a tube leading therefrom provided with a perforated return bend disposed above said cup, the terminal end of said tube lying within the clear water compartment.

2. A circulating element for coffee percolators, comprising a hood and a tube leading therefrom, comprising a pair of vertical legs, one of which is in communication with the interior of said hood, and the terminal end of the other being disposed adjacent to said hood, and a perforated laterally extending return bend goose-neck connecting said tubes at their upper ends.

In testimony whereof I affix my signature.

ROBERT WILLIAM HAGEL.